(12) United States Patent
Song et al.

(10) Patent No.: US 11,760,318 B2
(45) Date of Patent: Sep. 19, 2023

(54) PREDICTIVE DRIVER ALERTNESS ASSESSMENT

(71) Applicant: GM GLOBAL TECHNOLOGY OPERATIONS LLC, Detroit, MI (US)

(72) Inventors: Xiaofeng F. Song, Novi, MI (US); Benjamin D. DiDonato, Redford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 341 days.

(21) Appl. No.: 17/199,052

(22) Filed: Mar. 11, 2021

(65) Prior Publication Data

US 2022/0289151 A1 Sep. 15, 2022

(51) Int. Cl.
*B60T 7/12* (2006.01)
*B62D 15/02* (2006.01)
*G06K 9/00* (2022.01)
*G06V 20/56* (2022.01)
*G06V 20/59* (2022.01)

(52) U.S. Cl.
CPC .............. *B60T 7/12* (2013.01); *B62D 15/025* (2013.01); *G06V 20/588* (2022.01); *G06V 20/597* (2022.01); *B60T 2210/24* (2013.01); *B60T 2220/00* (2013.01)

(58) Field of Classification Search
CPC .... B60T 7/12; B60T 2210/24; B60T 2220/00; B60T 7/14; B60T 17/18; B62D 15/025; B62D 15/0285; G06V 20/588; G06V 20/597; G06V 40/171; B60W 2540/229; B60W 40/08; B60W 2540/225; B60W 2552/30; B60W 50/0097
See application file for complete search history.

(56) References Cited

U.S. PATENT DOCUMENTS

| | | | | |
|---|---|---|---|---|
| 9,653,001 B2* | 5/2017 | Mughal | ................ | G09B 19/167 |
| 9,956,963 B2* | 5/2018 | Vijaya Kumar | ...... | B60W 40/08 |
| 10,552,695 B1* | 2/2020 | Bush | ........................ | G06N 20/00 |
| 11,269,420 B1* | 3/2022 | Marti | ...................... | G06V 20/58 |
| 2010/0253543 A1* | 10/2010 | Szczerba | ................ | G06V 20/58 |
| | | | | 340/932.2 |
| 2013/0325202 A1* | 12/2013 | Howard | ................ | B60W 30/08 |
| | | | | 701/1 |
| 2013/0342366 A1* | 12/2013 | Kiefer | ..................... | B60Q 9/00 |
| | | | | 340/407.1 |

(Continued)

*Primary Examiner* — Mussa A Shaawat
(74) *Attorney, Agent, or Firm* — Lorenz & Kopf LLP

(57) ABSTRACT

In an exemplary embodiment, a system is provided that includes one or more first sensors, one or more second sensors, and a processor disposed onboard a vehicle. The first sensors are configured to at least facilitate obtaining first sensor data with regard to an external environment outside the vehicle. The second sensors are configured to at least facilitate obtaining second sensor data with regard to one or more eyes of a driver of the vehicle. The processor is configured to at least facilitate: determining a predicted gaze angle of the one or more eyes of the driver based on the external environment outside the vehicle, using the first sensor data; determining a measured gaze angle of the one or more eyes of the driver, using the second sensor data, and controlling one or more vehicle actions based on a comparison of the predicted and measured gaze angles.

20 Claims, 4 Drawing Sheets

(56) References Cited

U.S. PATENT DOCUMENTS

| | | | | |
|---|---|---|---|---|
| 2015/0109444 | A1* | 4/2015 | Zhang | G06V 20/58 |
| | | | | 348/148 |
| 2016/0298971 | A1* | 10/2016 | Mughal | G09B 19/167 |
| 2017/0183035 | A1* | 6/2017 | Patana | B60W 30/12 |
| 2018/0012118 | A1* | 1/2018 | Catten | G06N 3/006 |
| 2018/0215395 | A1* | 8/2018 | Keany | G06F 18/22 |
| 2018/0304920 | A1* | 10/2018 | Hirate | B62D 15/0285 |
| 2019/0232931 | A1* | 8/2019 | Heckmann | B60W 50/10 |
| 2019/0367050 | A1* | 12/2019 | Victor | G06V 20/597 |
| 2020/0183383 | A1* | 6/2020 | Stent | G06F 3/013 |
| 2020/0207358 | A1* | 7/2020 | Katz | G01C 21/3697 |
| 2020/0231182 | A1* | 7/2020 | Oba | B60W 40/09 |
| 2020/0290646 | A1* | 9/2020 | Safour | B60W 50/14 |
| 2020/0339133 | A1* | 10/2020 | Olsson | B60W 30/16 |
| 2020/0372263 | A1* | 11/2020 | Song | G05D 1/0251 |
| 2021/0146896 | A1* | 5/2021 | Bush | B60T 8/171 |
| 2021/0171067 | A1* | 6/2021 | Kang | B60W 40/09 |
| 2021/0188289 | A1* | 6/2021 | Oba | B60W 40/08 |
| 2021/0209922 | A1* | 7/2021 | Yang | B60W 40/08 |
| 2021/0331681 | A1* | 10/2021 | Im | B60W 50/08 |
| 2022/0032939 | A1* | 2/2022 | Urano | B60W 50/04 |
| 2022/0121867 | A1* | 4/2022 | Arar | G06V 20/588 |
| 2022/0194390 | A1* | 6/2022 | Ucar | B60W 50/0097 |
| 2022/0203996 | A1* | 6/2022 | Katz | G06V 10/7715 |
| 2022/0258771 | A1* | 8/2022 | Chung | B60W 40/08 |

* cited by examiner

PREDICTIVE DRIVER ALERTNESS ASSESSMENT

INTRODUCTION

The technical field generally relates to vehicles and, more specifically, to methods and systems for assessing an alertness of a driver of the vehicle.

Certain vehicles today are equipped to have one or more systems that monitor behavior of a driver of the vehicle. However, such existing systems may not always provide an optimal assessment of the alertness of the driver.

Accordingly, it is desirable to provide improved methods and systems for monitoring driver alertness in vehicles. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment, a system is provided that includes one or more first sensors, one or more second sensors, and a processor. The one or more first sensors are disposed onboard a vehicle, and are configured to at least facilitate obtaining first sensor data with regard to an external environment outside the vehicle. The one or more second sensors are disposed onboard the vehicle, and are configured to at least facilitate obtaining second sensor data with regard to one or more eyes of a driver of the vehicle. The processor is disposed onboard the vehicle, and is configured to at least facilitate: determining a predicted gaze angle of the one or more eyes of the driver based on the external environment outside the vehicle, using the first sensor data; determining a measured gaze angle of the one or more eyes of the driver, using the second sensor data, and controlling one or more vehicle actions based on a comparison of the predicted gaze angle and the measured gaze angle.

Also in an exemplary embodiment, the one or more first sensors include one or more exterior cameras that face outside the vehicle and that are configured to obtain external camera images of the external environment outside the vehicle; and the one or more second sensors include one or more interior cameras that face inside the vehicle and that are configured to obtain internal camera images of the driver inside the vehicle.

Also in an exemplary embodiment, the processor is further configured to at least facilitate: determining a trajectory curvature of a roadway on which the vehicle is travelling, based on the first sensor data; and determining the predicted gaze angle of the one or more eyes of the driver based on the trajectory curvature of the roadway.

Also in an exemplary embodiment, the processor is further configured to at least facilitate: determining one or more infrastructure objects of a roadway on which the vehicle is travelling, based on the first sensor data; and determining the predicted gaze angle of the one or more eyes of the driver based on the one or more infrastructure objects.

Also in an exemplary embodiment, the processor is further configured to at least facilitate controlling the one or more vehicle actions based on an absolute error between the predicted gaze angle and the measured gaze angle.

Also in an exemplary embodiment, the processor is further configured to at least facilitate providing a notification when the absolute error is greater than a predetermined threshold.

Also in an exemplary embodiment, the processor is further configured to at least facilitate automatically controlling movement of the vehicle when the absolute error is greater than a predetermined threshold.

Also in an exemplary embodiment, the processor is further configured to at least facilitate applying automatic braking for the vehicle when the absolute error is greater than a predetermined threshold.

Also in an exemplary embodiment, the processor is further configured to at least facilitate applying automatic steering for the vehicle when the absolute error is greater than a predetermined threshold.

Also in an exemplary embodiment, the processor is further configured to at least facilitate adjusting a threshold for one or more automatic control features for the vehicle when the absolute error is greater than a predetermined threshold.

In another exemplary embodiment, a method is provided that includes: obtaining first sensor data with regard to an external environment outside a vehicle; obtaining second sensor data with regard to one or more eyes of a driver of the vehicle; determining, via a processor, a predicted gaze angle of the one or more eyes of the driver based on the external environment outside the vehicle, using the first sensor data; determining, via the processor, a measured gaze angle of the one or more eyes of the driver, using the second sensor data, and controlling, via the processor, one or more vehicle actions based on a comparison of the predicted gaze angle and the measured gaze angle.

Also in an exemplary embodiment, the step of obtaining the first sensor data includes obtaining the first sensor data via an external camera of the vehicle that faces outside the vehicle and that is configured to obtain external camera images of the external environment outside the vehicle; and the step of obtaining the second sensor data includes obtaining the second sensor data via an internal camera of the vehicle that faces inside the vehicle and that is configured to obtain internal camera images of the driver inside the vehicle.

Also in an exemplary embodiment, the method further includes: determining, via the processor, a trajectory curvature of a roadway on which the vehicle is travelling, based on the first sensor data; wherein the step of determining the predicted gaze angle includes determining, via the processor, the predicted gaze angle of the one or more eyes of the driver based on the trajectory curvature of the roadway.

Also in an exemplary embodiment, the method further includes: determining, via the processor, one or more infrastructure objects of a roadway on which the vehicle is travelling, based on the first sensor data; wherein the step of determining the predicted gaze angle includes determining, via the processor, the predicted gaze angle of the one or more eyes of the driver based on the one or more infrastructure objects.

Also in an exemplary embodiment, the step of controlling the one or more vehicle actions includes controlling, via the processor, the one or more vehicle actions based on an absolute error between the predicted gaze angle and the measured gaze angle.

Also in an exemplary embodiment, the step of controlling the one or more vehicle actions includes applying automatic braking for the vehicle, via instructions provided by the processor, when the absolute error is greater than a predetermined threshold.

Also in an exemplary embodiment, the step of controlling the one or more vehicle actions includes applying automatic steering for the vehicle, via instructions provided by the processor, when the absolute error is greater than a predetermined threshold.

In another exemplary embodiment, a vehicle is provided that includes a body, a propulsion system, one or more first sensors, one or more second sensors, and a processor. The propulsion system is configured to generate movement of the body. The one or more first sensors are disposed onboard the vehicle, and are configured to at least facilitate obtaining first sensor data with regard to an external environment outside the vehicle. The one or more second sensors are disposed onboard the vehicle, and are configured to at least facilitate obtaining second sensor data with regard to one or more eyes of a driver of the vehicle. The processor is disposed onboard the vehicle, and is configured to at least facilitate: determining a predicted gaze angle of the one or more eyes of the driver based on the external environment outside the vehicle, using the first sensor data; determining a measured gaze angle of the one or more eyes of the driver, using the second sensor data, and controlling one or more vehicle actions based on a comparison of the predicted gaze angle and the measured gaze angle.

Also in an exemplary embodiment, the one or more first sensors include one or more exterior cameras that face outside the vehicle and that are configured to obtain external camera images of the external environment outside the vehicle; and the one or more second sensors include one or more interior cameras that face inside the vehicle and that are configured to obtain internal camera images of the driver inside the vehicle.

Also in an exemplary embodiment, the processor is further configured to at least facilitate: determining a trajectory curvature of a roadway on which the vehicle is travelling, based on the first sensor data; and determining the predicted gaze angle of the one or more eyes of the driver based on the trajectory curvature of the roadway.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
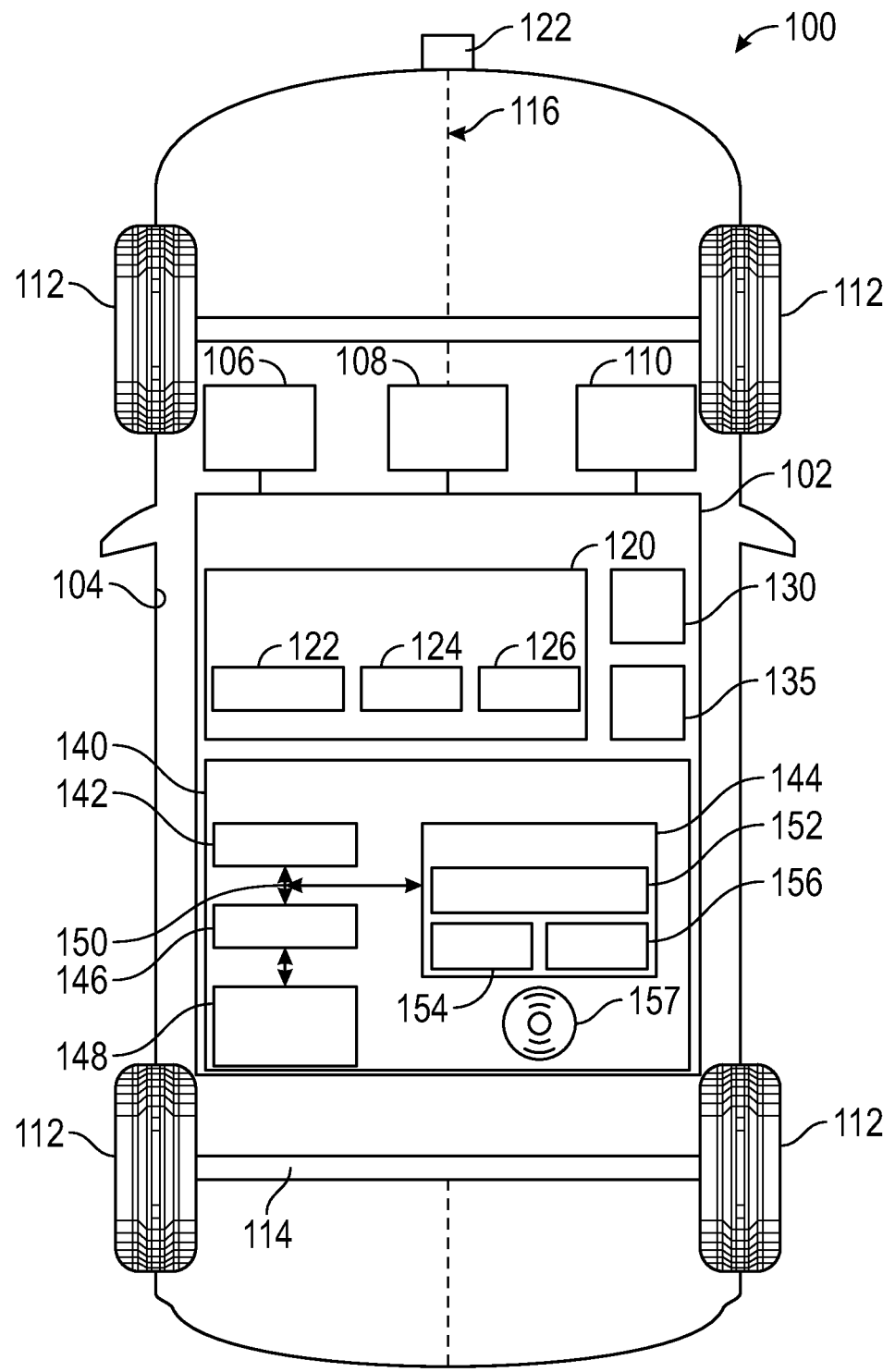
FIG. 1 is a functional block diagram of a vehicle having a control system for assessing an alertness of a driver of the vehicle, in accordance with exemplary embodiments.

FIG. 1 illustrates a vehicle 100. In various embodiments, and as described below, the vehicle 100 includes a control system 102 for assessing an8 alertness of a driver of the vehicle 100, based on a comparison of measured versus predicted gaze angles of the driver, including with respect to a driving environment surrounding the vehicle 100.

In various embodiments, the vehicle 100 comprises an automobile. The vehicle 100 may be any one of a number of different types of automobiles, such as, for example, a sedan, a wagon, a truck, or a sport utility vehicle (SUV), and may be two-wheel drive (2 WD) (i.e., rear-wheel drive or front-wheel drive), four-wheel drive (4 WD) or all-wheel drive (AWD), and/or various other types of vehicles in certain embodiments. In certain embodiments, the vehicle 100 may also comprise a motorcycle or other vehicle, such as aircraft, spacecraft, watercraft, and so on, and/or one or more other types of mobile platforms.

The vehicle 100 includes a body 104 that is arranged on a chassis 116. The body 104 substantially encloses other components of the vehicle 100. The body 104 and the chassis 116 may jointly form a frame. The vehicle 100 also includes a plurality of wheels 112. The wheels 112 are each rotationally coupled to the chassis 116 near a respective corner of the body 104 to facilitate movement of the vehicle 100. In one embodiment, the vehicle 100 includes four wheels 112, although this may vary in other embodiments (for example for trucks and certain other vehicles).

A drive system 110 is mounted on the chassis 116, and drives the wheels 112, for example via axles 114. In certain embodiments, the drive system 110 comprises a propulsion system. In certain exemplary embodiments, the drive system 110 comprises an internal combustion engine and/or an electric motor/generator, coupled with a transmission thereof. In certain embodiments, the drive system 110 may vary, and/or two or more drive systems 110 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

In various embodiments, the vehicle 100 includes one or more functions controlled automatically via the control system 102. In certain embodiments, such functions include the above-referenced drive system 110 as well as a braking system 106 and a steering system 108, as described below.

In exemplary embodiments, the braking system 106 controls braking of the vehicle 100 using braking components that are controlled via inputs provided by a driver (e.g., via a braking pedal in certain embodiments) and/or automatically via the control system 102. Also in exemplary embodiments, the steering system 108 controls steering of the vehicle 100 via steering components (e.g., a steering column coupled to the axles 114 and/or the wheels 112) that are controlled via inputs provided by a driver (e.g., via a steering wheel in certain embodiments) and/or automatically via the control system 102.

In the embodiment depicted in FIG. 1, the control system 102 is coupled to the braking system 106, the steering system 108, and the drive system 110. Also as depicted in FIG. 1, in various embodiments, the control system 102 includes a sensor array 120, a location system 130, a notification system 135, and a controller 140.

In various embodiments, the sensor array 120 includes various sensors that obtain sensor data for obtaining information maintaining movement of the vehicle 100 within an appropriate lane of travel. In the depicted embodiment, the sensor array 120 includes a plurality of cameras 122, 123, and well as one or more speed sensors 124 and/or other sensors 126.

In various embodiments, the cameras 122, 123 include one or more exterior cameras 122 and one or more interior cameras 123. In various embodiments, the exterior cameras 122 face toward, and capture camera images from, an exterior of the vehicle 100. In various embodiment, the exterior cameras 122 are disposed on the body 104 of the vehicle 100 (e.g., on a front bumper, rooftop, at or near a front windshield, or the like) and face in front of the vehicle 100, and obtain exterior camera data with respect to a driving environment in front of the vehicle 100, including a geometry of direction of the roadway in front of the vehicle 100.

Also in various embodiments, the interior cameras 123 face toward, and capture images from, an interior of the vehicle 100 (e.g., a cabin of the vehicle 100). In various embodiments, the interior cameras 123 are configured to capture images of a driver of the vehicle 100, including a face (and eyes) thereof, as interior camera data. In certain embodiments, the interior cameras 123 may be disposed on or near a front dash, roof, rear view mirror, and/or other part of the vehicle 100 with a view of the face (including the eyes) of the driver.

Also in various embodiments, the speed sensors 124 include one or more wheel speed sensors and/or other sensors that measure a speed of the vehicle 100 and/or information that may be used to ascertain the speed of the vehicle 100 (e.g., an acceleration of the vehicle 100). In addition, in certain embodiments, the one or more other sensors 126 may include one or more other detection sensors (e.g., radar, Lidar, sonar) that obtain sensor data pertaining to the external environment surrounding the vehicle 100, and/or one or more vehicle sensors that obtain sensor data pertaining to one or more vehicle driving states or inputs from the driver (e.g., in certain embodiments, one or more steering angle sensors, brake pedal engagement sensors, accelerator pedal engagement sensors, touch screen input sensors, and the like).

In certain embodiments, the location system 130 is configured to obtain and/or generate data as to a position and/or location in which the vehicle 100 is located and is travelling, including a roadway and direction of travel in which the vehicle 100 is travelling. In certain embodiments, the location system 130 comprises and/or or is coupled to a satellite-based network and/or system, such as a global positioning system (GPS) and/or other satellite-based system.

In various embodiments, the notification system 135 is configured to provide one or more notifications, including with respect to an alertness of the driver of the vehicle 100. In various embodiments, the notification system 135 provides one or more audio, visual, haptic, and/or other notifications, including within the vehicle 100, when it is determined that the driver is not sufficiently alert.

In various embodiments, the controller 140 is coupled to the sensor array 120, the location system 130, and the notification system 135. Also in various embodiments, the controller 140 comprises a computer system, and includes a processor 142, a memory 144, an interface 146, a storage device 148, and a computer bus 150. In various embodiments, the controller (or computer system) 140 controls various actions of the vehicle 100 (including providing notifications and controlling acceleration, braking, and steering of the vehicle 100) based on a determination as to a level of alertness of the driver of the vehicle 100. In various embodiments, the controller 140 provides these and other functions in accordance with the steps of the process 200 of FIG. 2 and implementations described further below, for example in connection with FIGS. 3-6.

In various embodiments, the controller 140 (and, in certain embodiments, the control system 102 itself) is disposed within the body 104 of the vehicle 100. In one embodiment, the control system 102 is mounted on the chassis 116. In certain embodiments, the controller 140 and/or control system 102 and/or one or more components thereof may be disposed outside the body 104, for example on a remote server, in the cloud, or other device where image processing is performed remotely.

It will be appreciated that the controller 140 may otherwise differ from the embodiment depicted in FIG. 1. For example, the controller 140 may be coupled to or may otherwise utilize one or more remote computer systems and/or other control systems, for example as part of one or more of the above-identified vehicle 100 devices and systems.

In the depicted embodiment, the computer system of the controller 140 includes a processor 142, a memory 144, an interface 146, a storage device 148, and a bus 150. The processor 142 performs the computation and control functions of the controller 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the controller 140 and the computer system of the controller 140, generally in executing the processes described herein, such as the process of FIG. 2 and implementations described further below, for example in connection with FIGS. 3-6.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program 152 along with a map database 154 (e.g., a database with data as to a roadway, including a direction and geometry thereof, in which the vehicle 100 is travelling, for example as determined in connection with the location system 130) and one or more stored values 156 (e.g., including, in various embodiments, threshold values with respect to a measured alertness of the driver, for example as to an absolute difference between a measured gaze angle versus a predicted gaze angle of the driver based on the driving environment outside the vehicle 100).

The bus 150 serves to transmit programs, data, status and other information or signals between the various components of the computer system of the controller 140. The interface 146 allows communication to the computer system of the controller 140, for example from a system driver and/or another computer system, and can be implemented using any suitable method and apparatus. In one embodiment, the interface 146 obtains the various data from the sensor array 120, the location system 130, and/or the notification system 135. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including various different types of direct access storage and/or other memory devices. In one exemplary embodiment, the storage device 148 comprises a program product from which memory 144 can receive a program 152 that executes one or more embodiments of one or more processes of the present disclosure, such as the steps of the process of FIG. 2 and implementations described further below, for example in connection with FIGS. 3-6. In another exemplary embodiment, the program product may be directly stored in and/or otherwise accessed by the memory 144 and/or a disk (e.g., disk 157), such as that referenced below.

The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 140 may also otherwise differ from the embodiment depicted in FIG. 1, for example in that the computer system of the controller 140 may be coupled to or may otherwise utilize one or more remote computer systems and/or other control systems.

Figure 2:
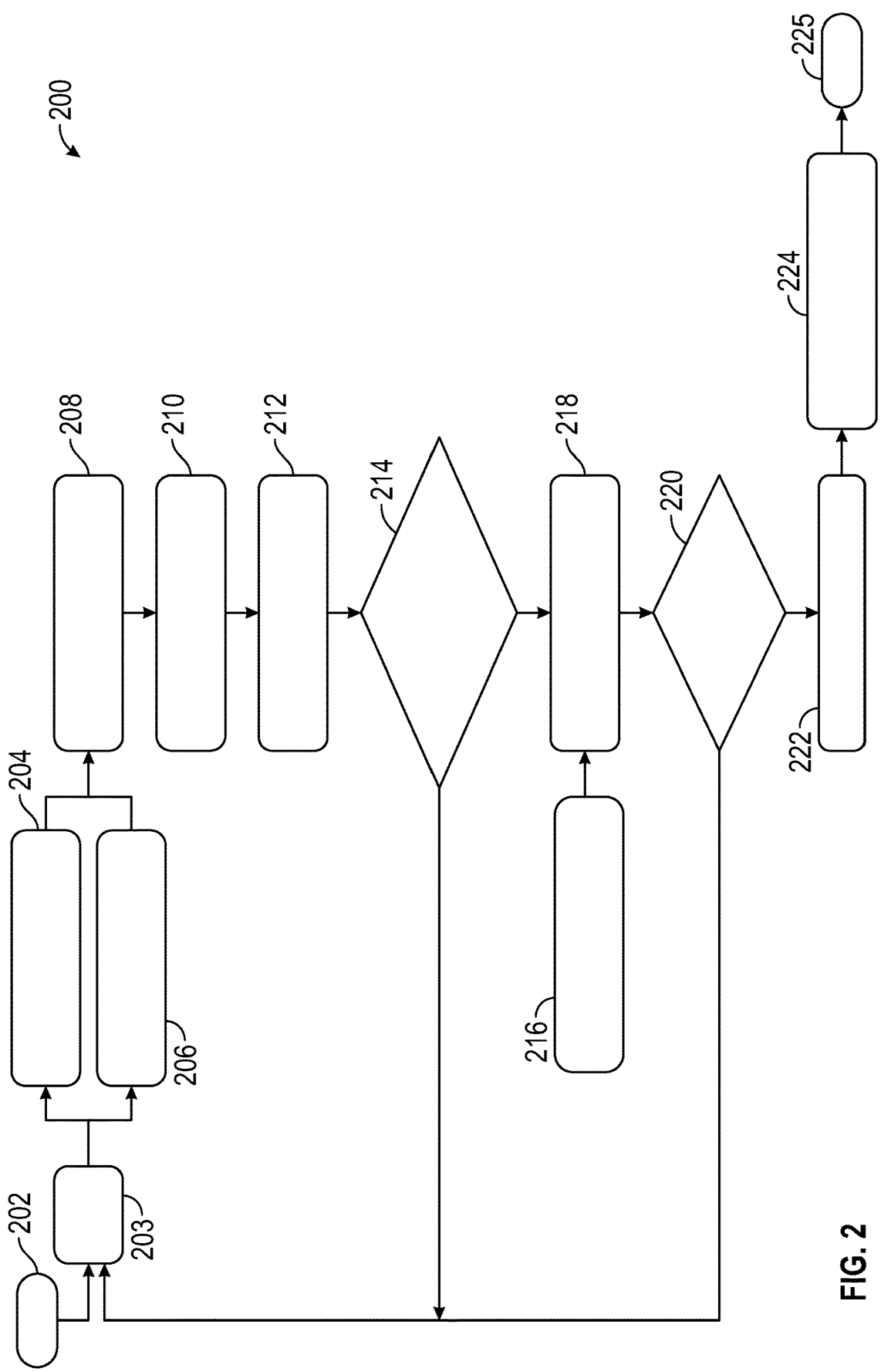
FIG. 2 is a flowchart of a process for assessing an alertness of a driver of a vehicle, and that can be utilized in connection with the vehicle of FIG. 1, in accordance with exemplary embodiments.

With reference to FIG. 2, a flowchart is provided of a process 200 for assessing an alertness of a driver of a vehicle, in accordance with exemplary embodiments. The process 200 can be implemented in connection with the vehicle 100 of FIG. 1, in accordance with exemplary embodiments. The process 200 is described below in connection with FIG. 2 as well as FIGS. 3-6, which depict exemplary implementations of the process 200.

As depicted in FIG. 2, the process 200 begins at step 202. In one embodiment, the process 200 begins when a vehicle drive or ignition cycle begins, for example when a driver or other user approaches or enters the vehicle 100, or when the driver or other user turns on the vehicle and/or an ignition therefor (e.g. by turning a key, engaging a keyfob or start button, and so on). In one embodiment, the steps of the process 200 are performed continuously during operation of the vehicle.

In various embodiments, data is obtained pertaining to the vehicle drive (step 203). In various embodiments, the data is obtained with respect to an external environment surrounding the vehicle (including trajectory curvature of the roadway) as well as activity of a driver of the vehicle (including a measured gaze angle of the driver) and operation of the vehicle (including a velocity of the vehicle). In various embodiments, the data obtained is obtained during step 203 form the sensor array 120, the location system 130, and the map database 154 of FIG. 1.

Specifically, in various embodiments, the exterior cameras 122 obtain camera data with respect to an environment surrounding the vehicle 100, including a geometry and the trajectory curvature of a roadway in front of the vehicle 100 (and, in certain embodiments, also with respect to traffic signs and/or other infrastructure of or along the roadway).

Also in various embodiments, during step 203, the interior cameras 123 obtain camera data with respect to a driver of the vehicle 100, including with respect to the driver's eyes.

In addition, in various embodiments, also during step 203, location data is obtained via the location system 130 with respect to the roadway on which the vehicle 100 is travelling, and map data is obtained via the map database 154 from the memory 144 of FIG. 1 pertaining to the roadway (e.g., based on the location data).

In addition, in certain embodiments, additional sensor data is obtained with respect to the vehicle 100 itself and movement thereof (e.g., including a velocity, acceleration, heading, and/or other data pertaining to the vehicle 100).

In various embodiments lane sensing and object detection is performed (step 204). In various embodiments, an identification is made with respect to the roadway (and corresponding lane thereof, and any corresponding traffic signs, traffic lights, other infrastructure, and/or other objects in connection with therewith) in which the vehicle 100 is travelling, based on sensor data from step 202 (e.g., based on the camera data form the exterior cameras 122 of FIG. 1) of step 203.

Also in various embodiments, additional information is identified pertaining to the driving environment (step 206). In various embodiments, the location data and map data of step 203 are utilized to generate detailed information, including an e-Horizon and road geometry (and road direction) in front of the vehicle 100.

In various embodiments, the lane sensing and object detection information (from step 204) and the additional information pertaining to the driving environment (from step 206) are fused tougher (step 208). In various embodiments, the processor 142 of FIG. 1 fuses together the data from steps 206 and 208 in order to generate fused data pertaining to the driving environment for the vehicle 100. In various embodiments, the fused data pertains to various aspects of the driving environment for the vehicle 100, such as by way of example: a direction and geometry of the roadway in front of the vehicle 100, as well as indexed road curvatures ahead of the vehicle 100, road merges and/or splits to the left and to the right, road signs, traffic lights, and so on. Also in various embodiments, the fused data also pertains to whether the immediate front of the vehicle 100 is obstructed by another vehicle and/or the vision from the vehicle 100 is blocked (e.g., for use with filtering valid versus invalid measured driver gaze data points, and so on).

Also in various embodiments, a trajectory curvature is calculated (step 210). In various embodiments, trajectory curvatures are calculated by the processor 142 of FIG. 1 with respect to the roadway (and lane thereof) at various distances in front of the vehicle 100. In addition, in certain embodiments, depending on the set up of the map database and location system (e.g., navigation system), if the location system supplies road trajectory curvature, then this information may be readily utilized in the process 200. Otherwise, in various embodiments, if road radius information is received, then the curvature of the inverse of the radius may be determined. In addition in various embodiments, if information as in the form of road trajectory points, then in various embodiments, a curve fitting process may be utilized to obtain the best estimate of road curvature at a certain distance. In various embodiments, the distances utilized in step 210 may include, but are not limited to, a calibratable value of roadway distance ahead, in km or seconds (time based on distance and vehicle speed), and following distances of vehicles ahead in same lane.

In various embodiments, a predicted gaze angle is generated (step 212). In various embodiments, the processor 142 of FIG. 1 generates a predicted Euler gaze angle for the pupils of the eyes of the driver of the vehicle 100 based on the trajectory curvatures of step 210. For example, in various embodiments, the predicted Euler gaze angle is determined based on a predicted direction in which the driver's eyes are predicted to be pointed, in view of the trajectory curvatures (e.g., such that the driver will be looking at the road ahead, including the curvature thereof, and/or in certain embodiments to be looking at an applicable traffic sign or traffic light, and so on). In certain embodiments, the predicted gaze angle may also incorporate one or more other vehicle parameters, such as a speed of the vehicle, and for example is filtered based on the vehicle speed. In various embodiments, during step 212: (i) an angle is obtained between a road trajectory point and a vehicle forward axis; (ii) an array is constructed of the gaze ray angles at incremental distances; and (iii) the angle element is selected at the distance of interest.

In various embodiments, a determination is also made as to whether the exterior camera view is blocked (step 214). Specifically, in various embodiments, the processor 142 first determines whether a forward view of the exterior camera 122 of FIG. 1 is blocked, so that meaningful camera data in front of the vehicle 100 is impossible to obtain at the present time and at the present location. In various embodiments, this determination is made based on the sensor data of step 203 (namely, from the exterior cameras 122).

In various embodiments, if it is determined in step 214 that the exterior camera view is blocked, then the process returns to step 203, as data continues to be obtained in a new iteration. In various embodiments, the process 200 thereby continues in a new iteration with updated data form step 203.

Conversely, if it is instead determined during step 214 that the exterior camera view is not blocked, then the process 200 proceeds instead to steps 216 and 218, described below.

In various embodiments, during step 216, a measured gaze angle of the eyes of the driver is identified (i.e., determined) based on the data of step 203. In various embodiments, the measured gaze angle comprises a measure representing detected gaze Euler angles of both of the eyes (as applicable, e.g., if the driver has two functioning eyes, and so on). In various embodiments, the measured gaze angle comprises an average (e.g., an arithmetic mean) of the gaze Euler angles of the pupils of the driver's eyes. In certain other embodiments, the measured gaze angle is identified by the processor 142 of FIG. 1 based on the camera data obtained via the interior cameras 123. In certain embodiments, the measured gaze angle may also incorporate one or more other vehicle parameters, such as a speed of the vehicle, and for example is filtered based on the vehicle speed. In certain embodiments, a minimum speed can be defined, wherein if a measured speed is less than the minimum speed, then the process will not calculate the road trajectory and predictions (e.g., when the vehicle 100 is travelling on a side street and/or is moving very slowly, and so on).

Also in various embodiments, during step 218, a comparison is made between the predicted gaze angle of step 212 and the measured gaze angle of step 216. In certain embodiments, the processor 142 of FIG. 1 compares the predicted gaze Euler angle of the driver's eyes of step 212 with the average of the measured (or detected) gaze Euler angles of step 216, and determines an absolute error by subtracting one of these values from the other and taking an absolute value thereof.

In various embodiments, a determination is made as to whether the difference between the predicted gaze angle and the measured gaze angle is greater than a predetermined threshold (step 220). In various embodiments, the processor 142 of FIG. 1 determines whether the absolute error calculated in step 218 is greater than the predetermined threshold (e.g., stored in the memory 144 of FIG. 1 as one or more stored values 156 thereof). In certain embodiments, the predetermined threshold of step 218 is equal to approximately seven degrees; however, this may vary in other embodiments.

In various embodiments, if the absolute value of the difference between the predicted gaze angle and the measured gaze angle is less than or equal to the predetermined threshold, then the process returns to step 203, as data continues to be obtained in a new iteration. In various embodiments, the process 200 thereby continues in a new iteration with updated data form step 203.

Conversely, in various embodiments, if the absolute value of the difference between the predicted gaze angle and the measured gaze angle is greater than the predetermined threshold, then the process proceeds instead to step 222. In various embodiments, during step 222, a driver attention score is calculated. In various embodiments, during step 222, the processor 142 of FIG. 1 calculates the driver attention score based on the absolute difference of step 218. In various embodiments, the driver attention score may incorporate a number of different factors, such as by way of example: vehicle speed, vehicle acceleration, steering activities, filtering, maturity time window, field of view (e.g., whether obstructed by another vehicle in front of the driver), and/or road type (e.g., residential, controlled uncontrolled, and so on), among other possible factors).

In addition, in various embodiments, one or more vehicle control actions are performed when the absolute value of the difference between the predicted gaze angle and the measured gaze angle is greater than the predetermined threshold (step 224).

In certain embodiments, during step 224, one or more notifications are provided, such as one or more audio, visual, and/or haptic notifications provided via the notification system 135 of FIG. 1 based on instructions provided by the processor 142 of FIG. 1. In certain embodiments, one or more other notifications may be provided, for example via a text message, e-mail, and/or other notification to an electronic device of the driver and/or to one or more remote servers (e.g., including the driver attention score of step 222).

In addition, in certain embodiments during step 224, one or more additional control actions may be provided, for example with respect to automatically control movement of the vehicle 100. For example, in certain embodiments, automatic braking and/or automatic steering may be provided by the braking system 106 and/or steering system 108 of FIG. 1 in accordance with instructions provided by the processor 142 of FIG. 1. Also in certain embodiments, acceleration and/or other movement of the vehicle 100 may also be automatically controlled by the drive system 110 of FIG. 1 in accordance with instructions provided by the processor 142.

In addition, in certain embodiments, threshold values may be adjusted for one or more automatic driver features of the vehicle 100. For example, in various embodiments, one or more thresholds may be adjusted for providing automatic steering, automatic braking, lane keep assist, or the like, such that such automatic features may be implemented sooner because the driver may be impaired or distracted, as compared with traditional or standard operation of the vehicle in which the driver is fully alert.

With reference to FIGS. 3-6, exemplary implementations are provided for the process 200 of FIG. 2, in accordance with exemplary embodiments.

Figure 3:
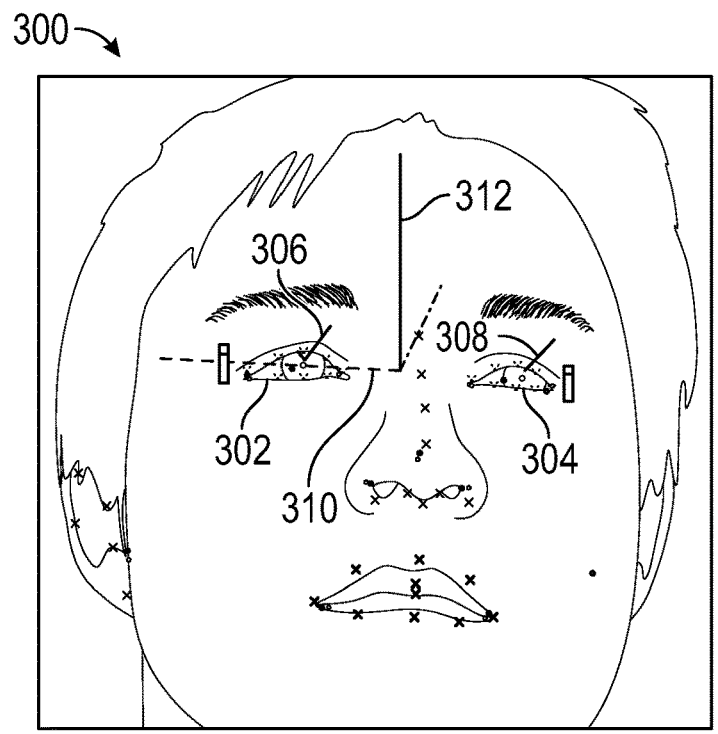
FIGS. 3-6 depict exemplary implementations of the process of FIG. 2, in accordance with exemplary embodiments.

FIG. 3 provides a first illustration of the face of a first driver 300 who is deemed to be alert (or attentive), in accordance with an exemplary embodiment. As depicted in FIG. 3, a first eye 302 and a second eye 304 of the first driver 300 are analyzed, with respect to a coordinate system with an x-axis 310 and a y-axis 312 with respect to a horizon in front of the vehicle 100. As shown in FIG. 3, the first eye 302 has a first gaze angle 306, and the second eye has a second gaze angle 308, respect to this coordinate system.

Figure 4:
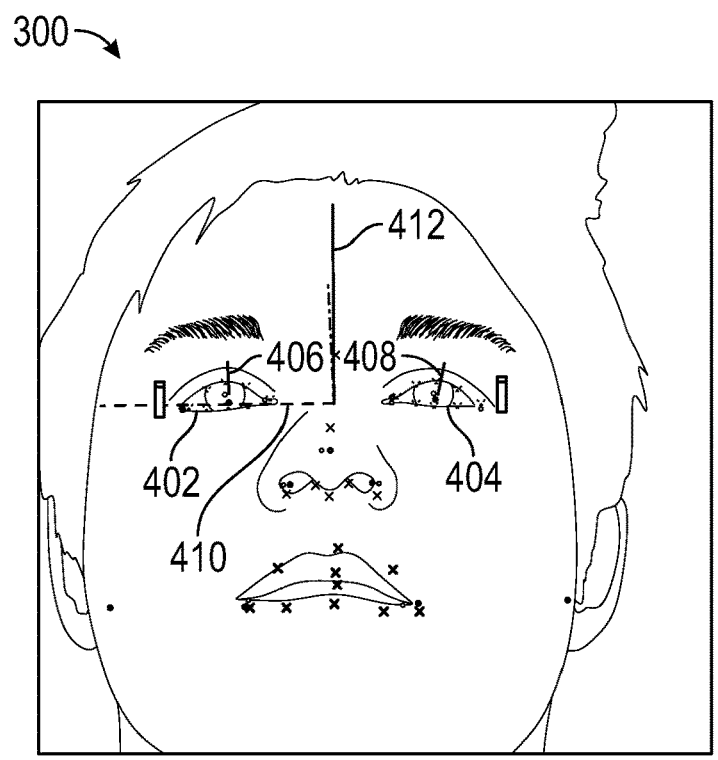

FIG. 4 provides a second illustration of the face of a second driver 400 who is deemed to be distracted (i.e., not alert, or not attentive), in accordance with an exemplary embodiment. As depicted in FIG. 4, a first eye 402 and a second eye 404 of the second driver 400 are analyzed, with respect to a coordinate system with an x-axis 410 and a y-axis 412 with respect to a horizon in front of the vehicle 100. As shown in FIG. 4, the first eye 402 has a first gaze angle 406, and the second eye has a second gaze angle 408, respect to this coordinate system.

Figure 5:
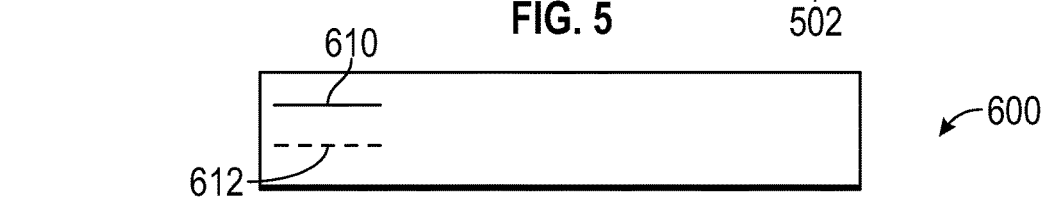
Figure 5:
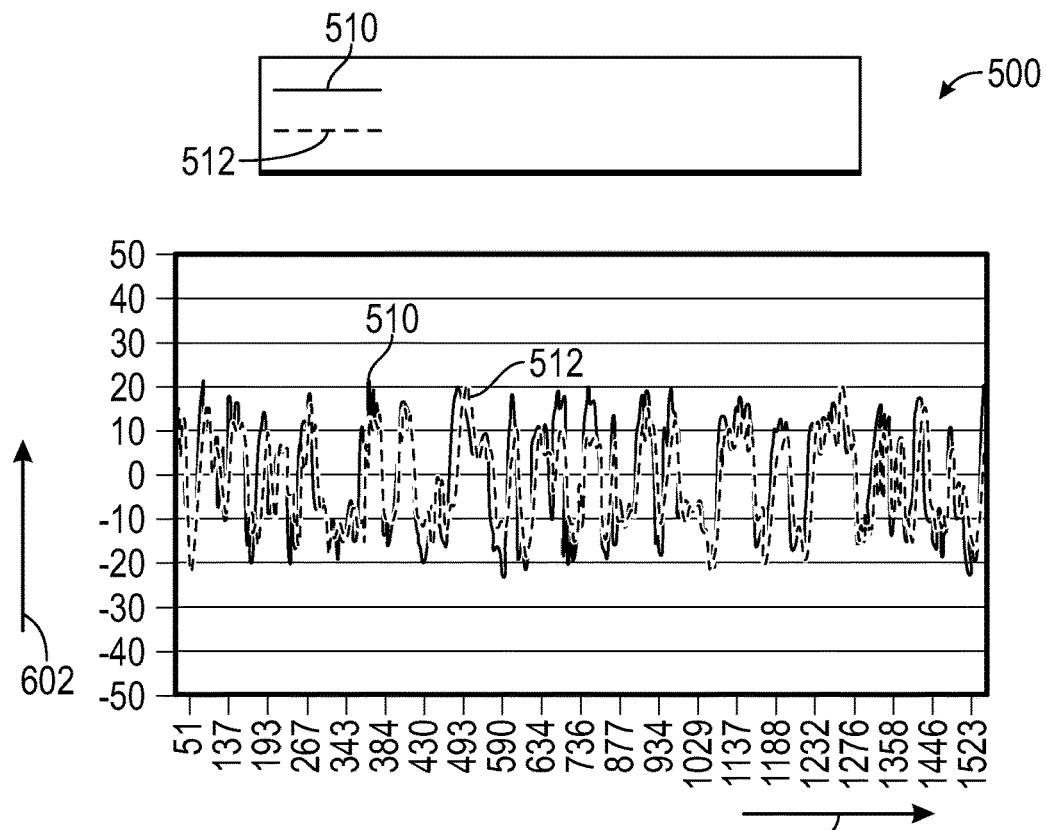

FIG. 5 provides a first comparison 500 of a predicted gaze angle 510 versus a measured gaze angle 512, in accordance with an exemplary embodiment corresponding to the first driver 300 of FIG. 3. In the embodiment of FIG. 5, the first comparison 500 is implemented in connection with a coordinate plane with an x-axis 502 comprising time (e.g., in seconds or milliseconds, in certain embodiments) and ay-axis 504 comprising the gaze angle (or average Euler gaze angle) of the eyes of the first driver 300. In various embodiments, the measured gaze angle 512 is generated via step 216 of the process 200 of FIG. 2, and is also filtered via vehicle speed. As illustrated in FIG. 5, in this example, the measured gaze angle 512 closely aligns with the predicted gaze angle 510, due to the alertness of the first driver 300 of FIG. 3 (and in contrast to the comparison illustrated below in connection with FIG. 6).

Figure 6:
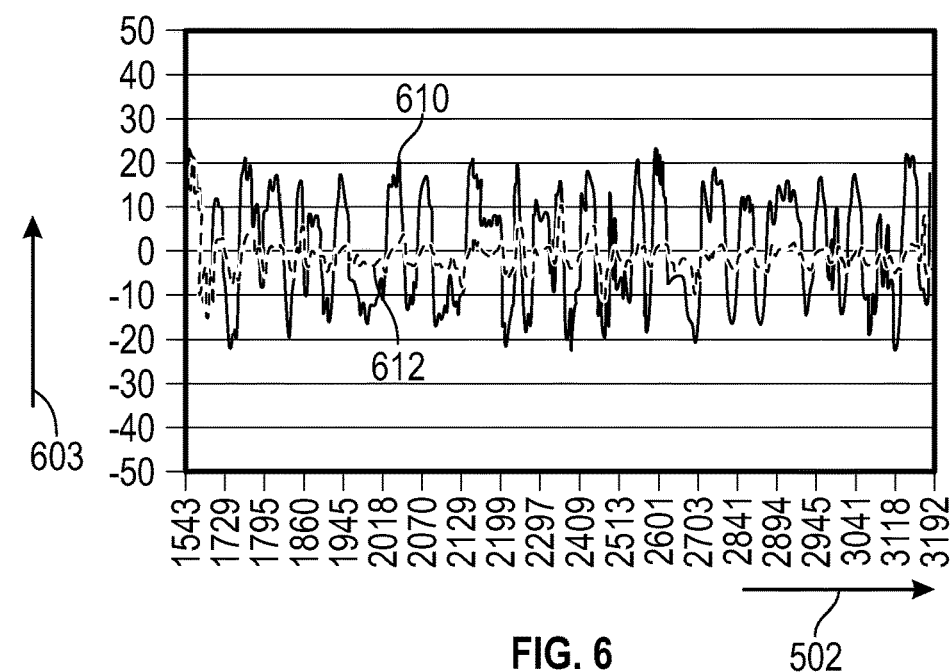

FIG. 6 provides a second comparison 600 of a predicted gaze angle 610 versus a measured gaze angle 612, in accordance with an exemplary embodiment corresponding to the second driver 400 of FIG. 4. In the embodiment of FIG. 6, the second comparison 600 is implemented in connection with a coordinate plane with an x-axis 602 comprising time (e.g., in seconds or milliseconds, in certain embodiments) and ay-axis 604 comprising the gaze angle (or average Euler gaze angle) of the eyes of the second driver 400. In various embodiments, the measured gaze angle 612 is generated via step 216 of the process 200 of FIG. 2, and is also filtered via vehicle speed. As illustrated in FIG. 6, in this example, the measured gaze angle 612 does not align as closely with the predicted gaze angle 610 (for example, in contrast to the first comparison 500 of FIG. 5) due to the distracted nature of the second driver 400 of FIG. 4.

Accordingly, methods, systems, and vehicles are provided for assessment of an alertness of a driver of the vehicle. In various embodiments, the alertness of the driver is determined based on how closely the driver's eyes are focused on environmental characteristics outside the vehicle during the vehicle drive. In certain embodiments, the alertness of the driver is determined based on a comparison of a predicted gaze angle versus a measured gaze angle of the driver's eyes based on a trajectory curvature of the roadway ahead of the vehicle, and in certain embodiments also based on road signs, traffic lights, and/or infrastructure and/or objects along the roadway in front of the vehicle.

In various embodiments, the disclosed techniques may provide an indication of driver alertness (or lack thereof) more quickly as compared with existing techniques, for example in that the disclosed techniques compare the driver's gaze angle with what is predicted based on the specific environment in front of the vehicle. For example, in certain embodiments, even though a driver may be looking outside the vehicle (or even at the roadway in general), it is possible that the driver's eyes may not be zeroed in on the upcoming trajectory curvature of upcoming segments of the roadway (which, for example, may be observed more quickly with the disclosed techniques as compared with other techniques that do not focus on the trajectory curvature or other features of the external environment outside of and in front of the vehicle).

Also in various embodiments, the disclosed techniques are also utilized for taking one or more vehicle control actions. In certain embodiments, notifications are provided for the driver and/or one or more other interested parties. Also in various embodiments, movement of the vehicle may be automatically controlled based on an assessment of the driver alertness, such as automatic braking, automatic steering, automatic control of the drive system (e.g., for deceleration), adjusting threshold parameters for lane keeping functions and/or one or more other automatic functions, and so on.

It will be appreciated that the systems, vehicles, and methods may vary from those depicted in the Figures and described herein. For example, the vehicle 100 of FIG. 1 may differ from that depicted in FIG. 1. It will similarly be appreciated that the steps of the process 200 may differ from those depicted in FIG. 2, and/or that various steps of the process 200 may occur concurrently and/or in a different order than that depicted in FIG. 2. It will similarly be appreciated that the various implementation of FIGS. 3-6 may also differ in various embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system comprising:
one or more first sensors disposed onboard a vehicle and configured to at least facilitate obtaining first sensor data with regard to an external environment outside the vehicle;
one or more second sensors disposed onboard the vehicle and configured to at least facilitate obtaining second sensor data with regard to one or more eyes of a driver of the vehicle; and a processor disposed onboard the vehicle and configured to at least facilitate:
 determining a predicted gaze angle of the one or more eyes of the driver based on the external environment outside the vehicle, using the first sensor data, wherein the predicted gaze is based on a predicted Euler gaze for pupils of the one or more eyes based on trajectory curvatures using a curvature of a road on which the vehicle is travelling;
 determining a measured gaze angle of the one or more eyes of the driver, using the second sensor data, and
 controlling one or more vehicle actions based on a comparison of the predicted gaze angle and the measured gaze angle.

2. The system of claim 1, wherein:
the one or more first sensors comprise one or more exterior cameras that face outside the vehicle and that are configured to obtain external camera images of the external environment outside the vehicle; and
the one or more second sensors comprise one or more interior cameras that face inside the vehicle and that are configured to obtain internal camera images of the driver inside the vehicle.

3. The system of claim 1, wherein the processor is further configured to at least facilitate:
 determining a trajectory curvature of a roadway on which the vehicle is travelling, based on the first sensor data; and
 determining the predicted gaze angle of the one or more eyes of the driver based on the trajectory curvature of the roadway.

4. The system of claim 1, wherein the processor is further configured to at least facilitate:
 determining one or more infrastructure objects of a roadway on which the vehicle is travelling, based on the first sensor data; and
 determining the predicted gaze angle of the one or more eyes of the driver based on the one or more infrastructure objects.

5. The system of claim 1, wherein the processor is further configured to at least facilitate controlling the one or more vehicle actions based on an absolute error between the predicted gaze angle and the measured gaze angle.

6. The system of claim 5, wherein the processor is further configured to at least facilitate providing a notification when the absolute error is greater than a predetermined threshold.

7. The system of claim 5, wherein the processor is further configured to at least facilitate automatically controlling movement of the vehicle when the absolute error is greater than a predetermined threshold.

8. The system of claim 5, wherein the processor is further configured to at least facilitate applying automatic braking for the vehicle when the absolute error is greater than a predetermined threshold.

9. The system of claim 5, wherein the processor is further configured to at least facilitate applying automatic steering for the vehicle when the absolute error is greater than a predetermined threshold.

10. The system of claim 5, wherein the processor is further configured to at least facilitate adjusting a threshold for one or more automatic control features for the vehicle when the absolute error is greater than a predetermined threshold.

11. A method comprising:
 obtaining first sensor data with regard to an external environment outside a vehicle;
 obtaining second sensor data with regard to one or more eyes of a driver of the vehicle;
 determining, via a processor, a predicted gaze angle of the one or more eyes of the driver based on the external environment outside the vehicle, using the first sensor data, wherein the predicted gaze is based on a predicted Euler gaze for pupils of the one or more eyes based on trajectory curvatures using a curvature of a road on which the vehicle is travelling;
 determining, via the processor, a measured gaze angle of the one or more eyes of the driver, using the second sensor data, and
 controlling, via the processor, one or more vehicle actions based on a comparison of the predicted gaze angle and the measured gaze angle.

12. The method of claim 11, wherein:
the step of obtaining the first sensor data comprises obtaining the first sensor data via an external camera of the vehicle that faces outside the vehicle and that is configured to obtain external camera images of the external environment outside the vehicle; and
the step of obtaining the second sensor data comprises obtaining the second sensor data via an internal camera of the vehicle that faces inside the vehicle and that is configured to obtain internal camera images of the driver inside the vehicle.

13. The method of claim 11, further comprising:
 determining, via the processor, a trajectory curvature of a roadway on which the vehicle is travelling, based on the first sensor data;
 wherein the step of determining the predicted gaze angle comprises determining, via the processor, the predicted gaze angle of the one or more eyes of the driver based on the trajectory curvature of the roadway.

14. The method of claim 11, further comprising:
 determining, via the processor, one or more infrastructure objects of a roadway on which the vehicle is travelling, based on the first sensor data;
 wherein the step of determining the predicted gaze angle comprises determining, via the processor, the predicted gaze angle of the one or more eyes of the driver based on the one or more infrastructure objects.

15. The method of claim 11, wherein the step of controlling the one or more vehicle actions comprises:
 controlling, via the processor, the one or more vehicle actions based on an absolute error between the predicted gaze angle and the measured gaze angle.

16. The method of claim 15, wherein the step of controlling the one or more vehicle actions comprises applying automatic braking for the vehicle, via instructions provided by the processor, when the absolute error is greater than a predetermined threshold.

17. The method of claim 15, wherein the step of controlling the one or more vehicle actions comprises applying automatic steering for the vehicle, via instructions provided by the processor, when the absolute error is greater than a predetermined threshold.

18. A vehicle comprising:
a body;
a propulsion system configured to generate movement of the body;
one or more first sensors disposed onboard the vehicle and configured to at least facilitate obtaining first sensor data with regard to an external environment outside the vehicle;

one or more second sensors disposed onboard the vehicle and configured to at least facilitate obtaining second sensor data with regard to one or more eyes of a driver of the vehicle; and a processor onboard the vehicle and configured to at least facilitate:

determining a predicted gaze angle of the one or more eyes of the driver based on the external environment outside the vehicle, using the first sensor data, wherein the predicted gaze is based on a predicted Euler gaze for pupils of the one or more eyes based on trajectory curvatures using a curvature of a road on which the vehicle is travelling;

determining a measured gaze angle of the one or more eyes of the driver, using the second sensor data, and controlling one or more vehicle actions based on a comparison of the predicted gaze angle and the measured gaze angle.

19. The vehicle of claim 18, wherein:

the one or more first sensors comprise one or more exterior cameras that face outside the vehicle and that are configured to obtain external camera images of the external environment outside the vehicle; and the one or more second sensors comprise one or more interior cameras that face inside the vehicle and that are configured to obtain internal camera images of the driver inside the vehicle.

20. The system of claim 18, wherein the processor is further configured to at least facilitate:

determining a trajectory curvature of a roadway on which the vehicle is travelling, based on the first sensor data; and determining the predicted gaze angle of the one or more eyes of the driver based on the trajectory curvature of the roadway.

* * * * *